(No Model.) 5 Sheets—Sheet 1.

E. & R. CORNELY.
EMBROIDERING MACHINE.

No. 479,057. Patented July 19, 1892.

Fig. 7ª.

Attest:
Geo. T. Smallwood,
Matthew Tilley

Inventors,
Emile Cornely and
Robert Cornely.
by Pollok & Mauro,
their attorneys.

THE NORRIS PETERS CO., PHOTO-LITHO., WASHINGTON, D. C.

(No Model.) 5 Sheets—Sheet 2.
E. & R. CORNELY.
EMBROIDERING MACHINE.
No. 479,057. Patented July 19, 1892.
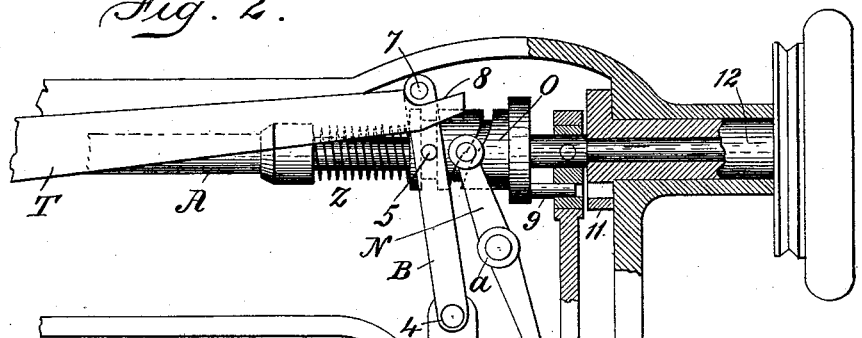
Fig. 2.
Fig. 4.
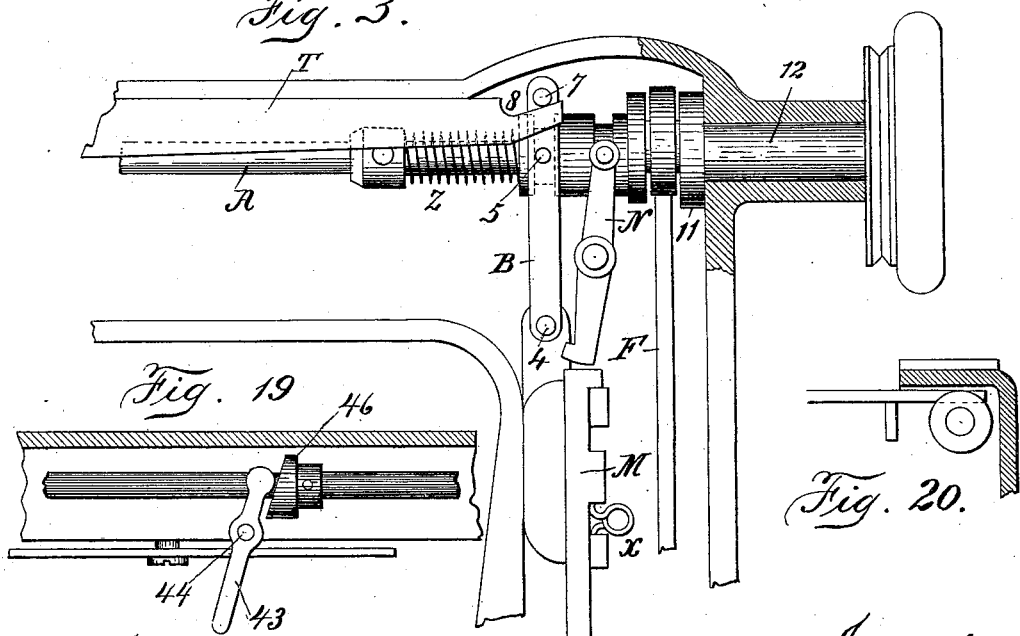
Fig. 3.
Fig. 19.
Fig. 20.
Attest:
Geo. T. Smallwood.
Matthew Allen
Inventors.
Emile Cornely and
Robert Cornely
by Pollok & Mauro
Attys.

(No Model.)  E. & R. CORNELY.  5 Sheets—Sheet 3.
EMBROIDERING MACHINE.

No. 479,057.  Patented July 19, 1892.

Attest:
Geo. T. Smallwood
Matthew Allen

Inventors,
Emile Cornely and
Robert Cornely
by Pollard Mauro
their attorneys (No Model.) 5 Sheets—Sheet 4.
E. & R. CORNELY.
EMBROIDERING MACHINE.
No. 479,057. Patented July 19, 1892.
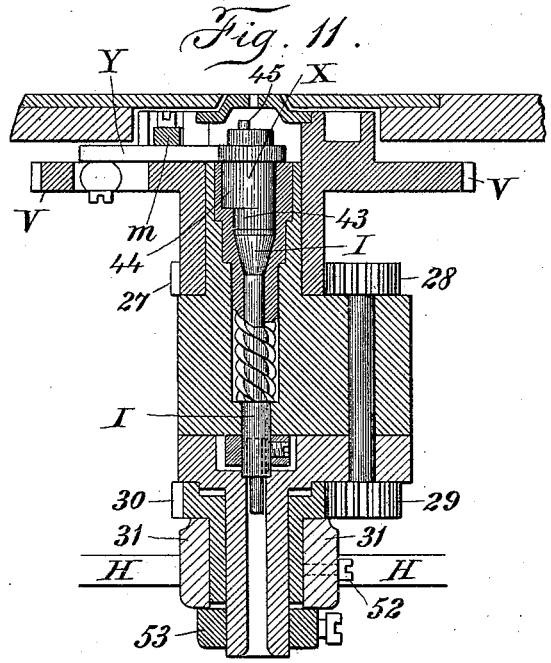
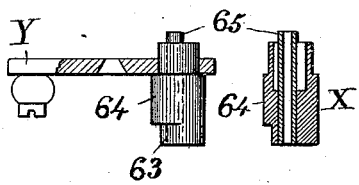
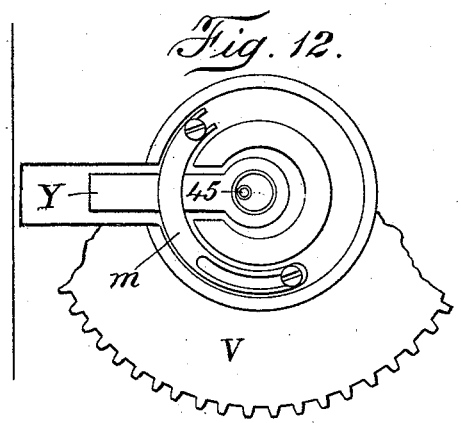
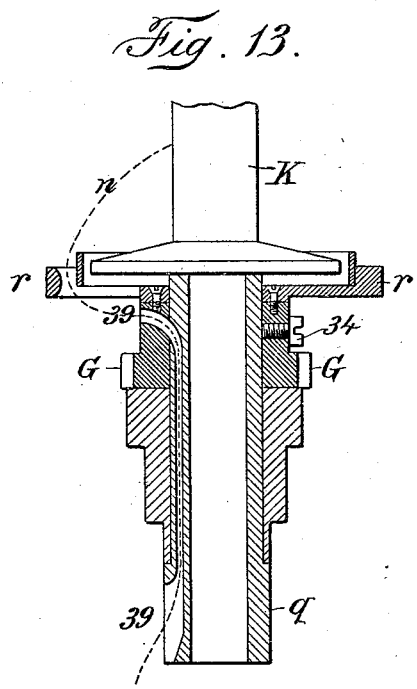
Attest:
Geo. T. Smallwood.
Jonathan Tilley
Inventors.
Emile Cornely and
Robert Cornely
by Pollok & Mauro
their attorneys.

(No Model.)　　　　　　　　　　　　　　　　　　5 Sheets—Sheet 5.
E. & R. CORNELY.
EMBROIDERING MACHINE.
No. 479,057.　　　　　　　　　　Patented July 19, 1892.
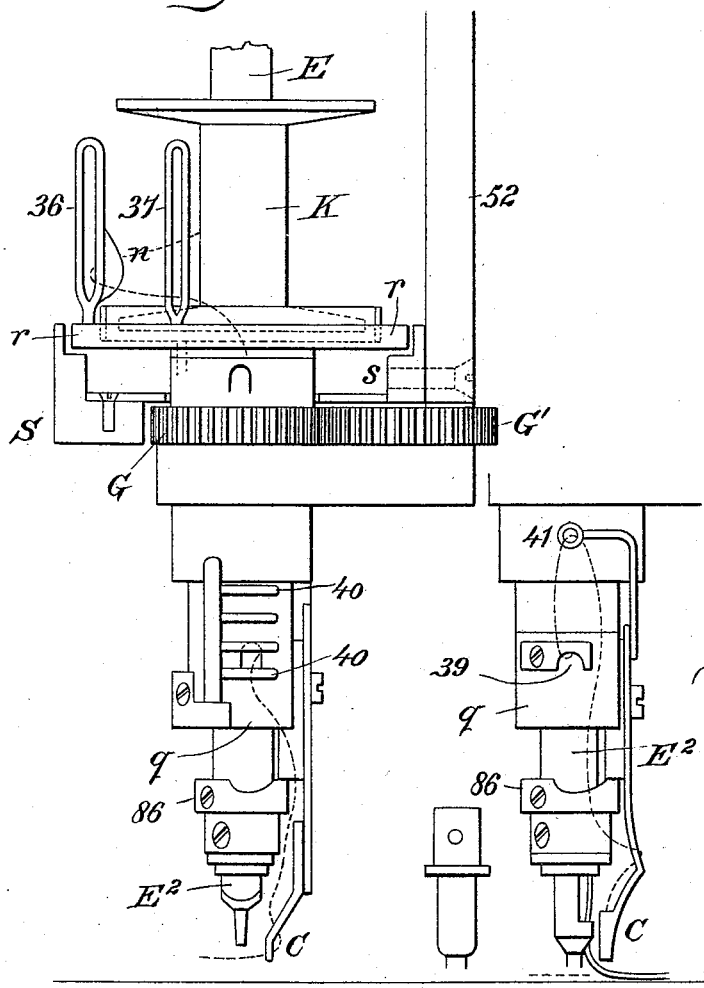
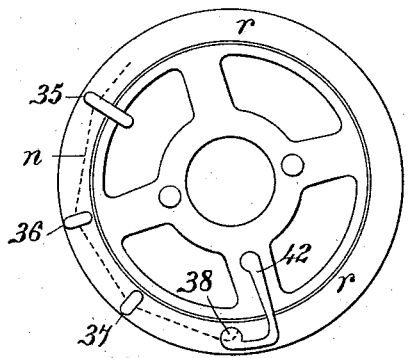

UNITED STATES PATENT OFFICE.

EMIL CORNELY AND ROBERT CORNELY, OF PARIS, FRANCE.

EMBROIDERING-MACHINE.

SPECIFICATION forming part of Letters Patent No. 479,057, dated July 19, 1892.

Application filed January 9, 1892. Serial No. 417,508. (No model.)

*To all whom it may concern:*

Be it known that we, EMIL CORNELY and ROBERT CORNELY, residents of Paris, in the Republic of France, have invented new and useful Improvements in Embroidering-Machines, which are fully set forth in the following specification.

The present invention has reference to embroidering-machines of the type described in Letters Patent No. 461,737, granted to us October 20, 1891. The said machine is designed and adapted to produce a seam composed of two parallel rows of chain-stitches having a thread wound spirally around the same on the face of the fabric. The parallel rows of stitches are produced by means of two hook-needles carried by needle-bars which are connected with and movable by means of the crank-handle of the universal feed, so that the seam may be laid in any desired direction. The revolving thread-carrier is supplied from a spool which surrounds the nipple-tube, and the latter, in order to permit of the removal and replacement of this spool, is made in two parts which can be readily coupled and uncoupled. Means were provided for applying the tension of a brake-lever to this spool from the crank-handle of the universal feed, so as to arrest the spool quickly when the stop-motion of the machine is actuated.

The present invention comprises certain improvements upon machines of the type above referred to, which improvements can be most conveniently explained in connection with the accompanying drawings, in which—

Figure 1:
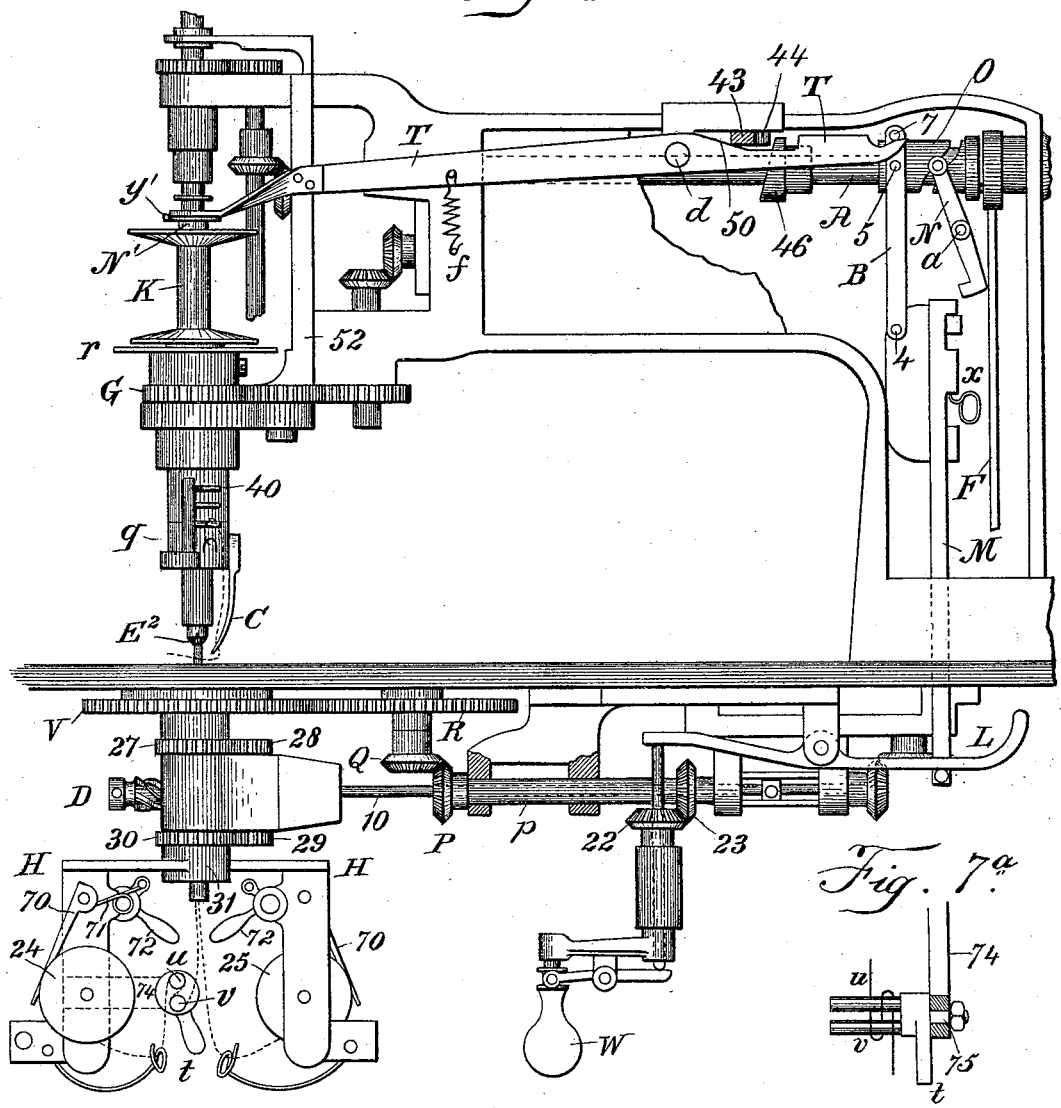
Figure 5:
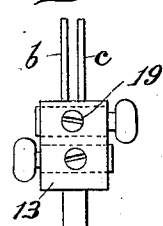
Figure 6:
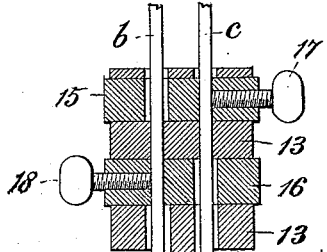
Figure 7:
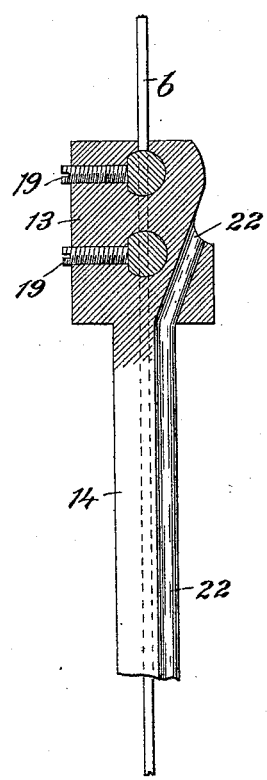
Figure 10:
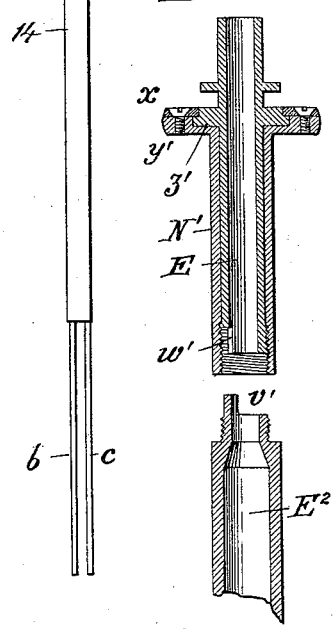
Figure 8:
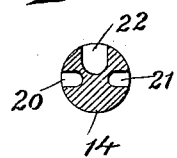
Figure 9:
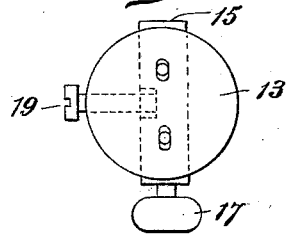

Figure 1 is a side view of a machine constructed in accordance with the invention. Figs. 2 and 3 are sectional elevations of part of the mechanism for actuating the brake-lever. Fig. 4 is a detail of the cam O. Fig. 5 is a detail in elevation of the needle-bars and their supports; Figs. 6 and 7, sectional elevations of the same. Fig. 7ª is a detail of the additional tension device of the thread-spools, and Fig. 8 a cross-section thereof. Fig. 9 shows a detail hereinafter referred to. Fig. 10 is a detail in vertical section showing the two-part nipple-tube. Figs. 11 and 12 are details in vertical section and plan of the looper mechanism and connected parts. Figs. 13 and 14 are detail veiws in vertical section and side elevation, respectively, showing the devices for supplying thread to the revolving thread-carrier. Fig. 15 is a plan view of the plate supporting the spool K, and Fig. 16 a further detail in elevation. Figs. 17 and 18 are details illustrating the looper and its support. Figs. 19 and 20 are detail views of parts connected with the operation of the brake-lever.

In making seams of the character above referred to it is desirable to have the two needles work at various distances from one another, so as to produce seams of different widths. To facilitate this object and to enable the needle-bars to adjust themselves to the proper position with reference to the holes in the nipple-tube, the needle-bars are supported on transversely-adjustable slides, as shown in Figs. 5, 6, 7, 8, and 9. The needle-bar holder is composed of two parts—the head 13 and the stem 14. The head 13 is perforated transversely for the reception of two rods or slides 15 and 16, which are movable therein, the motion, however, being limited by stop-screws 19, whose ends take into notches in the slides 15 16. (See Fig. 9.) Bar $b$ is secured to the slide 16 by means of screw 18 and bar $c$ is secured to the slide 15 by means of screw 17. Both needle-bars are thus free to move laterally in their support to a limited extent and can adjust themselves in conformity with the holes in the nipple-tube. The bars $b$ $c$ lie in grooves 20 21 in the stem 14, Fig. 8, and the groove 22 in the latter serves for the passage of a cord if one be employed in the work.

The central spool K, which surrounds the nipple-tube and needle-bars and supplies the thread to revolving thread-carrier C, is controlled by means of a brake-lever T, Figs. 1, 2, and 3. As described in the patent above referred to, this brake-lever was connected with the lever L of the well-known stop-motion of the machine, so that its end was brought to bear upon the spool when the machine was stopped by pressing up the end of handle W. It is found to be disadvantageous to operate the brake-lever by direct connection with the lever L, and therefore other means have been adopted, as will now be described.

O represents the grooved cam of the stop-motion.

N is a lever pivoted to the frame and having one end engaged in the groove of cam O.

By pressing down the crank-handle W, Fig. 1, the lever L draws downward the rod M to the position shown in Figs. 1 and 3, in which position lever N can freely swing back and forth on its pivot $a$ under the action of cam O. This cam is at this time pushed to the right by spring $z$, so that its coupling-pin 9 enters the hole in coupling-disk 11, which is secured to the driving-shaft 12. Thus the shaft A is coupled with shaft 12; but as soon as handle W is released spring $x$ forces rod M upward into the path of lever N, as shown in Fig. 2. Consequently said lever is arrested, and as cam O continues to turn it is gradually forced to the left by the action of lever N upon the groove of the cam until coupling-pin 9 is withdrawn from engagement with the disk 11.

So far we have described only the well-known stop-motion of the machine. It will now be shown how the movement of cam O lengthwise of shaft A actuates the brake-lever.

A lever B, pivoted on stud 4, carries a pin 5, which enters a circular groove 6 of cam O, Fig. 4, and another stud 7 bears upon the incline 8 on the short arm of lever T. When the machine is stopped and cam O moves to the left, the latter carries lever B with it, and the stud 7, descending the incline 8 on the short arm of the lever T, permits the latter to drop by its own weight, assisted, if necessary, by a light spring $f$, Fig. 1, upon the top of spool K, thus checking the rotation of the latter. When, on the other hand, cam O and lever B are shifted to the right, the stud 7 depresses the short arm of lever T by acting on the incline 8 and raises its long arm from spool K, which can thus turn freely during the operation of the machine.

When the spool K is to be withdrawn from or placed upon the machine, it is necessary that the brake-lever T be raised and held in an elevated position. This is effected by means of the small lever 43, Figs. 1, 19, and 20, which is pivoted at 44 to the machine-frame. By moving lever 43 to the left it bears against the incline 50 of lever T and depresses the short arm thereof. At its inner end lever 43 is in contact with a cam 46 on shaft A, and when the latter begins to rotate it restores lever 43 to its normal position, thus providing against the chance of forgetfulness on the part of the operator.

The spool K, already referred to, surrounds the upper part E of the two-part nipple-tube E E², (which can be disconnected or uncoupled, as presently explained, for the purpose of removing and replacing the spool.) The said spool rests upon the central tube $q$, which is attached to the pinion G by set-screw 34, Fig. 13. A circular plate $r$, Figs. 1, 13, and 14, is secured to the hub of pinion G, and the thread-guides 35, 36, and 37 are secured to plate $r$. Thread $n$ passes from spool K through said thread-guides and through the aperture 38, and thence through the vertical channel 39, which extends through tube $q$. From the mouth of the channel 39 the thread passes between the tension-thread guides 40 to the revolving thread-carrier C. The slot 42, Fig. 15, which communicates with hole 38, serves for the introduction of the threading-wire which carries the thread down through the channel 39. In some kinds of work, where a strong tension is applied to the thread of spool K, it is desirable to employ a take-up, such as 41, carried by the upper part of the thread-carrier C, to which, as described in the patent aforesaid, a rising and falling motion is imparted by means of the annular cam 86, attached to the nipple-tube.

A box S, Fig. 14, is secured to the part 52 of the frame of the machine for the purpose of catching any threads or fibers from spool K and preventing them from lodging on or between the pinions G G′ and turning plate $r$.

As already stated, to permit the spool K to be removed and replaced, the nipple-tube must be made in two parts. The construction preferably adopted for this purpose is shown in Fig. 10. A sleeve N′ is fitted closely upon the upper section E of the nipple-tube, so that it can turn thereon. At its upper end it has a flange $y'$, upon which rests the flange or collar $z'$ of tube E, being held in place by a washer $x'$. The lower end of sleeve N is screw-threaded internally, and the upper end of section E² of the nipple-tube is correspondingly threaded externally. Section E² has a tongue $v'$, which enters a corresponding notch $w'$ in the section E. By inserting the section E² into the lower end of sleeve N′ and turning the latter by its flange $y'$ the two sections of the tube will be drawn and held tightly together.

To supply the two needles with thread to form the stitches, a double-spool holder is employed, the construction and arrangement of these parts being illustrated in Figs. 1 and 11. The hub of carrier H, which carries the two thread-spools 24 25, is secured to the hub of pinion 30 by means of a set-screw 52, Fig. 11, and rests upon a collar 53, attached to the frame at 54. Pinion 30 is driven by pinion 29, and the latter is connected with and receives motion from the crank-handle W through the pinions 22 23, tube $p$, and pinions P, Q, R, V, 27, and 28. Thus the spool-carrier follows the direction of the universal feed and retains always the same position relative to the needles.

In addition to the usual tensions of the thread-spools as heretofore used, consisting of an arm 70, which is pressed against the spool by a spring 71, the tension of which is regulated by a lever 72, an additional friction-tension is employed. This tension is composed of two studs $u\ v$, Figs. 1 and 7$^a$, and which can be turned by means of the handle $t$, carrying a swiveled pin 75, bearing in arm 74 of the spool-frame to regulate the amount of friction on the thread.

The removable looper (shown in Figs. 11, 17, and 18) is composed of two parts—the plate Y, which holds it in place upon the face of the pinion V, and the plug X. The latter has a concentric part 63 and an eccentric part 64, which fit into corresponding recesses of the hollow screw-spindle I, and consequently the plug X cannot turn independently of said spindle, but participates in the oscillations of spindle I, and its thread-tube 65, oscillating around the needle, winds its thread around in the ordinary way. Plate Y is held in place by the circular bolt $m$, Fig. 12, as described in our prior application filed July 2, 1891.

Having now fully described our said invention, what we claim, and desire to secure by Letters Patent, is—

1. In an embroidering-machine organized to produce a seam composed of parallel rows of stitches with a thread wound around both rows, the combination of the nipple-tube, the revolving thread-carrier, the spool surrounding said nipple-tube for supplying thread to said carrier, and the two needle-bars and their support, each of said needle-bars being adjustable transversely with respect to said support, so that they may work at different distances from each other, substantially as described.

2. In an embroidering-machine, the combination, with a suitable looper and its actuating mechanism, of the nipple-tube and two needle-bars inclosed thereby, said needle-bars being each carried by a slide adjustable transversely in the needle-bar support, substantially as described.

3. In an embroidering-machine of the character specified, having a universal feed, a nipple-tube, a revolving thread-carrier, and a spool surrounding said nipple-tube and adapted to supply said thread-carrier, the combination of a brake-lever having its end in proximity to said tube, a cam, and means actuated from the handle of the universal feed for shifting the cam to couple and uncouple the main from the driving shaft, and a lever actuated by said cam to apply and release the brake-lever, substantially as described.

4. The combination, with the spool surrounding the nipple-tube, the brake-lever, and means for applying the latter when the machine is stopped, of a hand-lever for releasing the brake-lever while the machine is at rest, and a cam for restoring said hand-lever to its normal position when the machine is set in operation, substantially as described.

5. The combination, with the universal feed mechanism, the two needles, and their needle-bars connected with the operating-handle of said feed mechanism, of a looper co-operating with said needles to form a double row of chain-stitches, a double-spool holder, also connected with said operating-handle, and an adjustable tension device carried by said spool-holder, substantially as described.

In testimony whereof we have signed this specification in the presence of two subscribing witnesses.

EMIL CORNELY.
    ROBERT CORNELY.

Witnesses:
 WILSON P. BOYD,
 W. D. HUNTER.